No. 634,290. Patented Oct. 3, 1899.
A. H. GARDNER.
PAIL HOOK OR CORNER IRON.
(Application filed May 24, 1899.)
(No Model.)
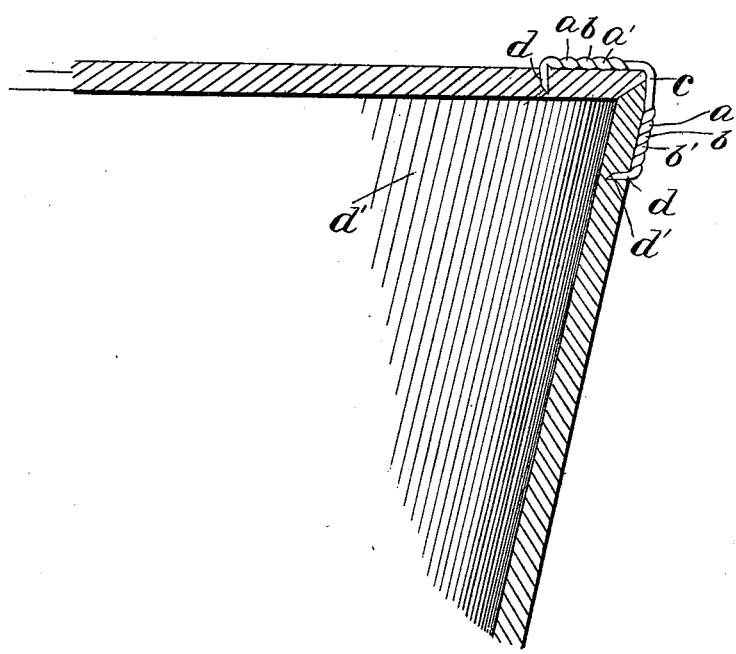
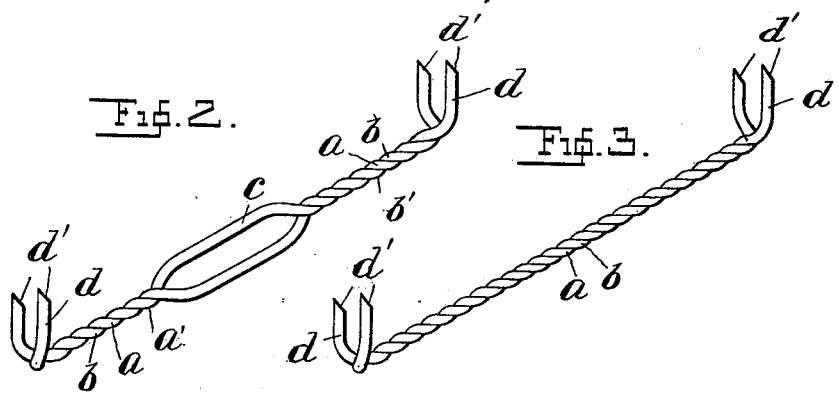
Witnesses.
Inventor
Augustus H. Gardner
By
Atty

UNITED STATES PATENT OFFICE.

AUGUSTUS H. GARDNER, OF NEW YORK, N. Y., ASSIGNOR, BY MESNE ASSIGNMENTS, TO THE TWISTED WIRE BOX STRAP COMPANY, OF SAME PLACE.

PAIL-HOOK OR CORNER-IRON.

SPECIFICATION forming part of Letters Patent No. 634,290, dated October 3, 1899.

Application filed May 24, 1899. Serial No. 718,014. (No model.)

*To all whom it may concern:*

Be it known that I, AUGUSTUS H. GARDNER, a citizen of the United States, residing at New York, (Brooklyn,) in the county of Kings and State of New York, have invented certain new and useful Improvements in Pail-Hooks or Corner-Irons, of which the following is a specification.

The object of my invention is to provide a simple, effective, and cheap pail-hook or corner-iron; and to this end my invention consists, broadly, of a pail-hook or corner-iron formed of two rods or wires twisted together and formed at its ends with two prongs or barbs bent at an angle to the main body of the hook. In the preferred form of my pail-hook a central loop portion is made to facilitate the bending of the hook over a corner of the pail, box, or other receptacle to which the hook is applied.

In the accompanying drawings, which form a part of this specification, Figure 1 is a detail sectional view illustrating the preferred form of my improved pail-hook secured in place upon a pail or receptacle. Fig. 2 is a perspective view of the same. Fig. 3 is a perspective view of a slightly-modified form.

Referring first to Figs. 1 and 2, the pail-hook is formed of two rods or wires $a\,b$, twisted tightly together, as shown at $a'\,b'$, and formed with a central open portion or loop $c$. The ends of the wires are separated slightly and bent at an angle to the main body of the pail-hook to form prongs or barbs $d$, the prongs being beveled off to points $d'$ to facilitate driving into the pail, box, or other receptacle.

As shown in Fig. 1, the prongs at one end of the pail-hook are driven into the box or receptacle at a sufficient distance from the corner to bring the open portion or loop $c$ over the corner when the pail-hook is bent, as shown. The hook is then bent around the corner, and the prongs at the opposite end are driven into the side of the box or receptacle. The prongs or barbs are formed with substantially parallel bevel portions or points to insure the parallelism of the barbs or prongs when they are driven into the box. The wires $a\,b$ may have a continuous twist, as shown, or an alternate twist at opposite ends of loop $c$.

In the form of pail-hook or corner-iron shown in Fig. 3 the two wires $a\,b$ are twisted tightly together from end to end, the ends of the wires being bent and formed into prongs or hooks $d$, as shown in the preferred form of device.

Having thus described my invention, what I claim as new, and desire to secure by Letters Patent, is—

1. A pail-hook or corner-iron comprising two wires or rods twisted together and having the opposite ends separated and bent at an angle to the main body of the pail-hook to form prongs or barbs, as set forth.

2. A pail-hook or corner-iron comprising two wires or rods twisted together formed with a central open portion or loop $c$, and with the end barbs or hooks $d$ bent at an angle to the body of the pail-hook, substantially as set forth.

AUGUSTUS H. GARDNER.

Witnesses:
WM. E. KNIGHT,
M. V. BIDGOOD.